Dec. 9, 1958        N. W. TRASK, SR        2,863,576
METHOD AND APPARATUS FOR UNLOADING A SILO
Filed May 13, 1955        4 Sheets-Sheet 1
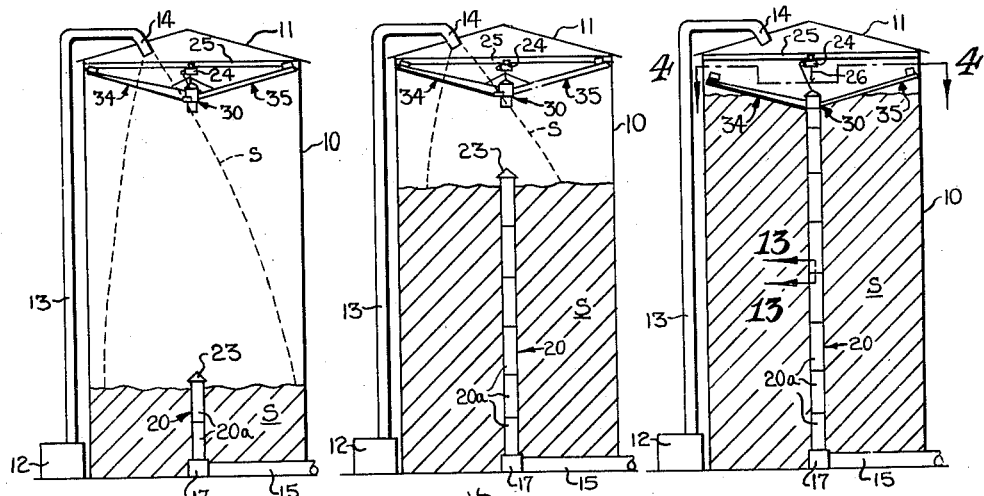
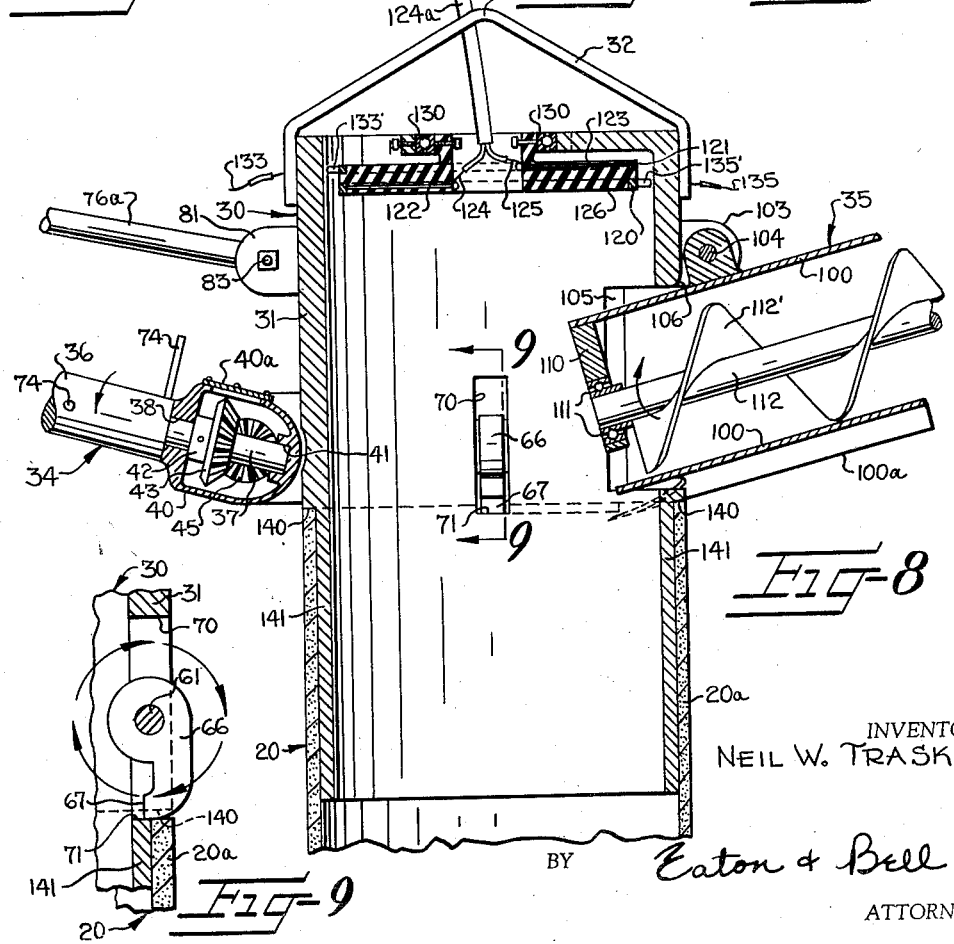
INVENTOR:
NEIL W. TRASK, SR.
BY Eaton & Bell
ATTORNEYS

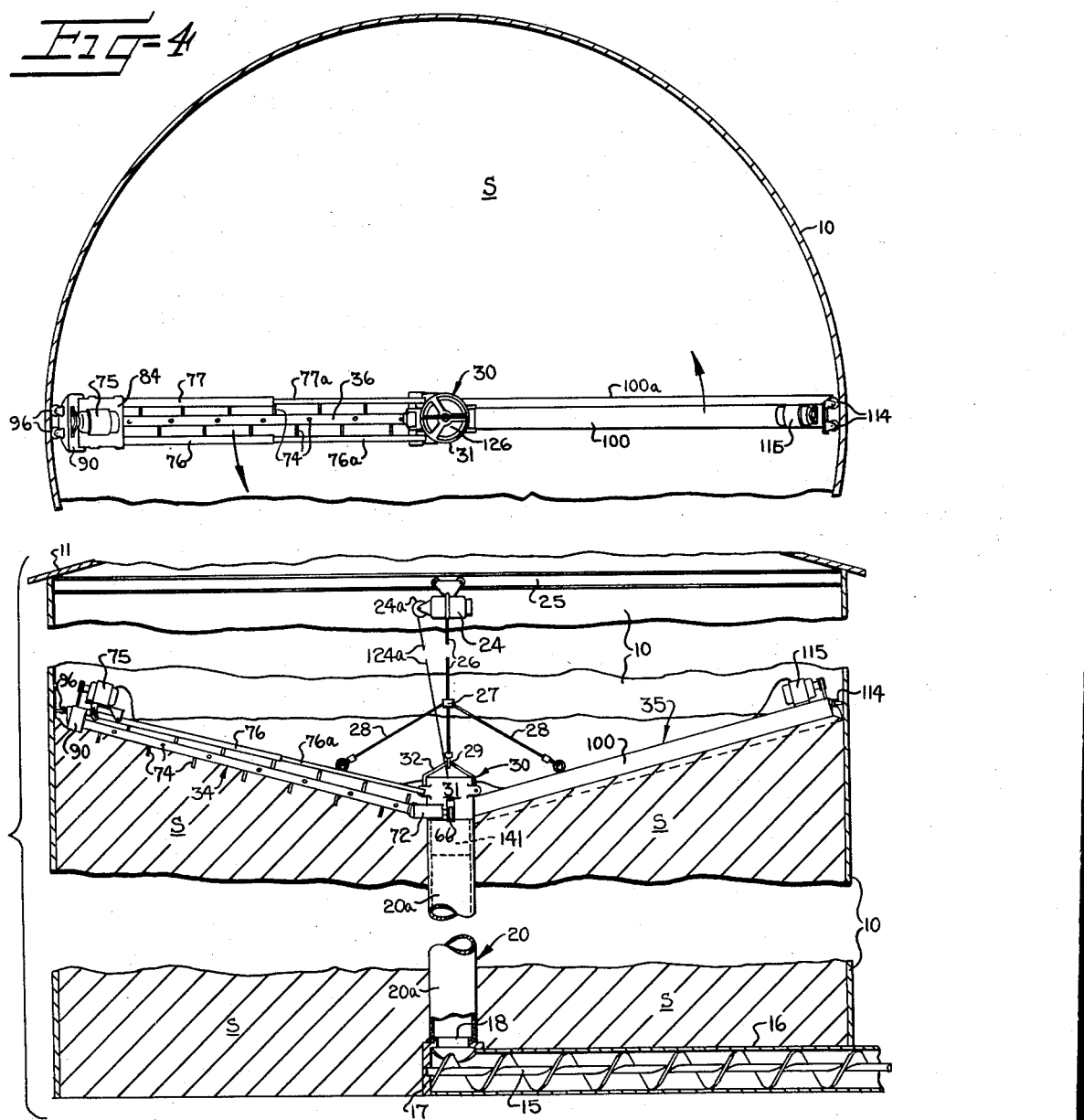

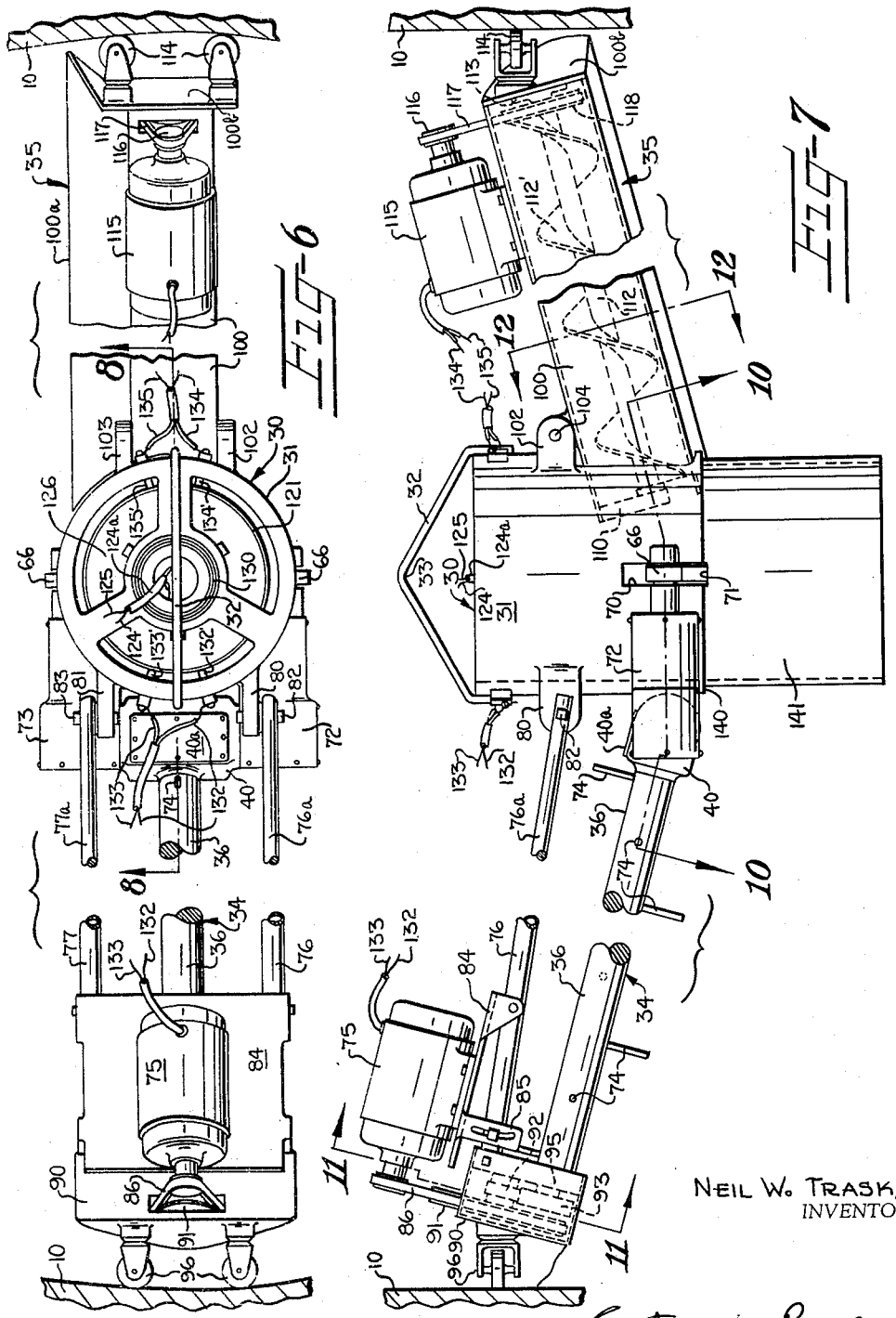

Dec. 9, 1958    N. W. TRASK, SR    2,863,576
METHOD AND APPARATUS FOR UNLOADING A SILO
Filed May 13, 1955    4 Sheets-Sheet 4
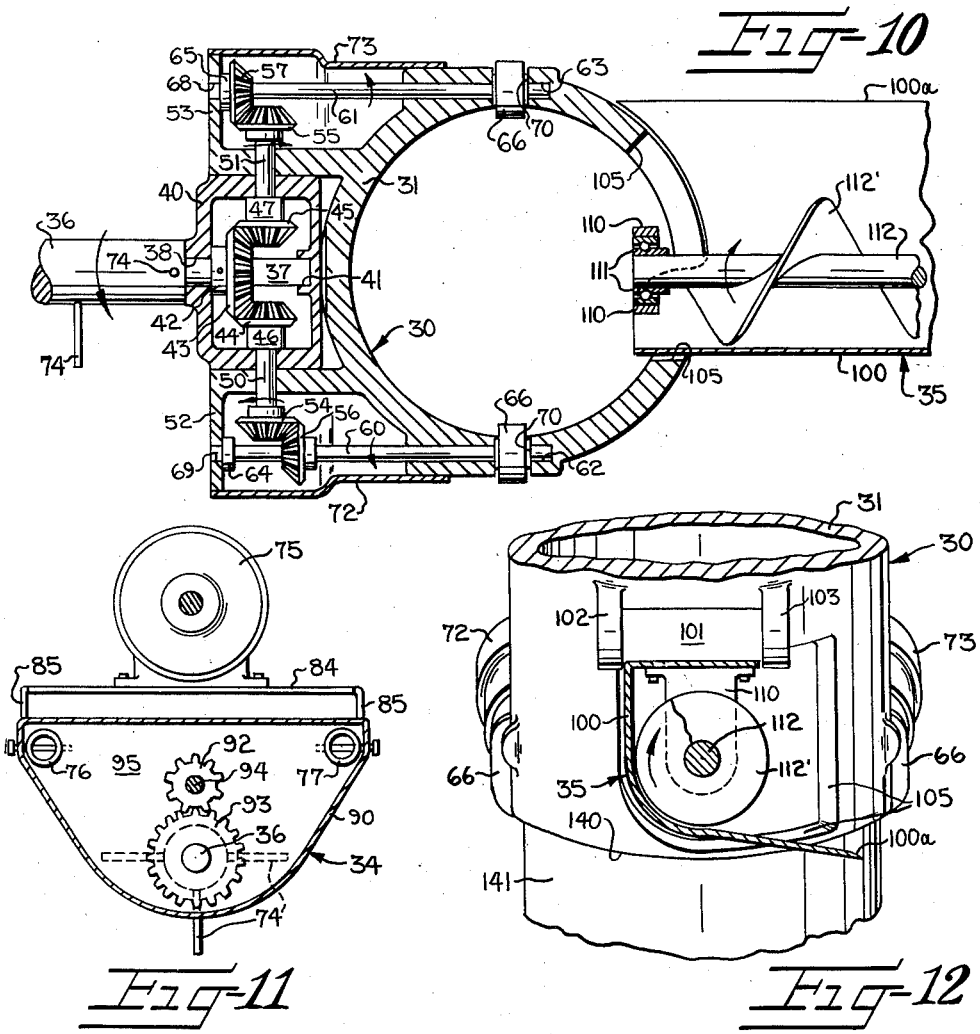
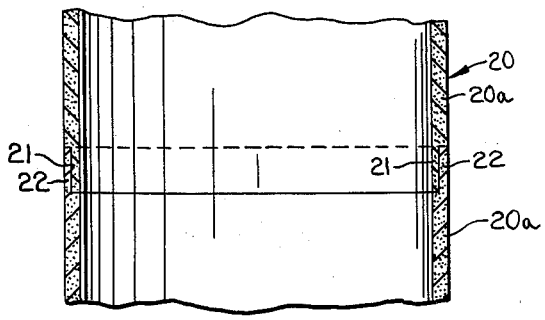
NEIL W. TRASK, SR.,
INVENTOR
BY  Eaton + Bell
ATTORNEYS United States Patent Office 2,863,576
Patented Dec. 9, 1958

2,863,576

METHOD AND APPARATUS FOR UNLOADING A SILO

Neil W. Trask, Sr., Calhoun Falls, S. C., assignor of one-sixth to Amie Leith Trask and one-sixth to Leith Paul Trask, both of Calhoun Falls, one-sixth to Amie Trask Wright and one-sixth to Margaret Trask Hughes, both of Anderson, and one-sixth to Neil W. Trask, Jr., Burton, S. C.

Application May 13, 1955, Serial No. 508,132

18 Claims. (Cl. 214—17)

This invention relates to a method and apparatus for unloading stored materials, and more particularly it relates to unloading silage from a silo wherein the apparatus substantially rests on the silage in the silo and is adapted to remove portions of the silage and pass the same down through a passageway formed through the silage in the silo to a conveyor which removes the silage from the silo.

Heretofore, the removal of silage from the upper end of a silo has been a difficult and hazardous problem since, by ordinary methods, a farm operator has to climb to the top of the silo and thereupon manually shove out the silage. Silos are generally constructed with a cement cylindrical wall having a vertically extending slot therein which slot is normally closed by a plurality of vertically positioned doors. The doors are removed as the surface of the silage lowers so the operator thus will have an opening through which to remove the silage. By the utilization of a mechanical unloader the necessity of manually removing the silage has been eliminated, but it is still necessary for the operator to climb up along the outer wall of the silo and thereupon manually remove the doors as the level of the silage descends. Applicant has solved this problem by providing a novel unloading device that entirely eliminates this vexing and dangerous task.

It is applicant's prime object therefore to provide a silo unloader wherein the removal of the silo doors is unnecessary and the full length of the silo can be emptied without manual effort on the part of the operator.

It is another important object of this invention to provide an improved method of unloading silage from a circular silo which comprises feeding the silage into a vertical, centrally located tube and progressively cutting away the upper end of the tube as the level of the silage descends and while conveying the silage away from the lower end of the tube.

It is another object of this invention to provide a silo unloading apparatus comprising a rotatable carriage arranged to ride upon the silage and having means to loosen the silage and feed it into a centrally located vertical tube surrounded by the silage.

It is another object of this invention to provide an apparatus of the character last described wherein the carriage has means thereon for cutting away the upper end of the tube as the unloading progresses so the upper end of the tube is constantly maintained on substantially the same level as the silage.

It is also an object to provide a silo unloader device for unloading silage from a silo wherein said unloader device has a main housing resting on the upper portion of a tube extending down through the silage and a plurality of cutting blades for cutting away the upper edge portions of the tube are positioned in the housing to thus permit the unloader device to move downwardly automatically within the silo as the level of the silage descends.

Still another object is to provide a central tube or passageway in the silage within the silo wherein said tube is formed of edible compressed fibers so that the same may be readily mixed with the silage which is to be fed to cattle or animals.

Some of the objects of the invention having been stated, other objects will appear as the description proceeds, when taken in connection with the accompanying drawings, in which—

Figure 1 is a schematic vertical sectional view of a silo showing the unloading apparatus or carriage suspended in the upper portion thereof while the silage is being entered through the top of the silo;

Figure 2 is a view similar to Figure 1 showing how the central tube sections are added as the depth of the silage increases in the silo;

Figure 3 is another view similar to Figure 1 showing the silo completely filled with the unloading device resting on the silage and the upper edge of the central tube in operating position;

Figure 4 (Sheet 2) is a top plan view on an enlarged scale taken substantially along the line 4—4 in Figure 3 and showing the unloading device positioned within the confines of the silo in operating position;

Figure 5 is a vertical sectional view of the structure shown in Figure 4;

Figure 6 is an enlarged top plan view of the unloading device shown in Figure 5, with parts broken away;

Figure 7 is a side elevation of the unloading device shown in Figure 6;

Figure 8 (Sheet 1) is an enlarged fragmentary vertical sectional view taken along line 8—8 of Figure 6;

Figure 9 is an enlarged fragmentary vertical section of the tube cutting device taken along line 9—9 of Figure 8;

Figure 10 (Sheet 4) is a fragmentary enlarged sectional plan view of the unloading device taken substantially along line 10—10 of Figure 7;

Figure 11 is an enlarged vertical sectional view taken along line 11—11 in Figure 7 and showing the driving means for rotating the unloading device;

Figure 12 is a fragmentary vertical section on an enlarged scale taken along line 12—12 in Figure 7 and showing the relationship of the silage feeder or conveyor to the central tube portion;

Figure 13 is a greatly enlarged fragmentary vertical section taken along line 13—13 of Figure 3 and showing how a plurality of tube section members forming the central tube will engage each other in locking relationship.

Referring to the drawings, the reference numeral 10 (Figures 1 to 3 and 5) indicates a storage bin or circular silo having a cap or roof portion 11 thereon. Adjacent the base of the silo 10 a conventional chopping machine 12 is provided having a blower directing the chopped vegetation upwardly through a tube 13 having a curved upper portion 14 which extends through the roof 11 for directing material to be stored such as silage S into the silo 10. A suitable conveyor or worm screw feeder device 15 is positioned in the bottom of the silo for carrying the silage S outside the silo. A suitable housing or tube 16 (Figure 5) encloses the conveyor 15 and has one end received in a box or corner housing 17 which is centrally located in the silo 10. The tube 16 has an aperture adjacent the inner end to coincide with an aperture in the box or corner housing 17 defined by an annular shoulder or flange 18 to permit communication therebetween.

A conveyor feeder passageway or tube 20 is formed by a plurality of edible nad readily digestible compressed fiber-board tube sections 20a, the lowermost of which is positioned to encircle the annular flange 18 on the housing 17. Additional mating tubes 20a each having a male end 21 and a female end 22 (Figure 13) are connected together and the uppermost tube has a removable cap 23 to prevent the silage S from entering therein during the filling of the silo. As will be observed in Figures 1, 2 and 3, the tubes 20a are added as the silage S increases in height in the silo 10. It will be noted that the cap 23 for the tubes is always maintained above the level of the silage S during the filling of the silo.

A hoist 24 (Figures 1, 2, 3 and 5), preferably of the electrically operated type, is mounted on a track 25 carried by the upper portion of the silo 10. A cable, chain or pliable lift element 26 depends from hoist 24 and has a collar 27 fixed on a medial lower portion thereof from which a pair of downwardly diverging pliable lifting members 28 extend. The lower ends of lifting members 28 are connected to spaced portions of a rotatable carriage or silage unloader broadly designated at 30.

The silage unloader comprises a central or axial tubular housing 31 to which the lower ends of a pair of upwardly converging side portions of a lifting rod 32 are secured. The juncture of the latter side portions forms an engaging portion 33 for a hook 29 on the lower end of cable 26. Portion 33 of lifting rod 32 insures that hook 29 is centrally positioned relative to housing 31 so the carriage 30 is raised and lowered by the hoist 24 in co-axial relation to the tube 20.

A combination carriage driving unit and silage loosening device 34 is pivotally connected to one side of the axial housing 31 and a silage feeder or conveyor unit 35 is pivotally connected to the other side of housing 31. The silage loosening device 34 comprises a shaft 36 having a reduced inner end portion 37 (Figures 8 and 10) journaled in bearing portions 38, 41 in the outer and inner walls of a gear box or housing 40. A hub 42 of a bevel gear 43 is fixed on portion 37 of shaft 36 and engages the inner surface of the outer wall of housing 40 to prevent endwise movement of shaft 36.

A pair of opposed bevel gears 44 and 45 mounted on one end of shafts 50 and 51, respectively, are positioned at right angles to the shaft 37 and mesh with the bevel gear 43 thereon. Hub portions 46 and 47 of the bevel gears 44 and 45, respectively, are suitably secured to the shafts 50 and 51, respectively. It will be observed in Figure 10 that the hubs 46 and 47 engage the inner surface of the side walls of the housing 40 to maintain the bevel gears 44 and 45 in proper meshing relationship with the bevel gear 43 on shaft 37.

As will be observed in Figure 10, the axial housing 31 has a pair of auxiliary housings 52 and 53 formed integral therewith and between which the housing 40 is positioned so it is pivotally mounted by the shafts 50 and 51, respectively, which extend through side wall portions of the housings 40, 52 and 53. Bevel gears 54 and 55 are fixed on the other ends of the shafts 50 and 51, respectively, for meshing with bevel gears 56 and 57 secured to shafts 60 and 61 arranged at right angles to shafts 50 and 51, respectively.

One end of the shafts 60 and 61 rest in bearings 68, 69 positioned in the front wall of housings 52, 53. The other ends of the shafts 60 and 61, remote from the end whereon the bevel gears 56 and 57 are mounted, are journalled in bearings 62 and 63 formed in the housing 31. A collar 64 is suitably secured on the end of the shaft 60 adjacent the front or outer wall of the housing 52 to prevent the shaft 60 from moving out beyond the housing 52. A hub 65 formed integral with the bevel gear 57 on shaft 61 is adjacent the inner surface of the front or outer wall of the housing 53 to prevent outward movement of the shaft 61 from the housing 53.

Each of the shafts 60 and 61 adjacent the bearings 62, 63 has a cutting device 66 suitably secured thereon in opposed relation to rotate therewith and each of the cutting devices is provided with a cutting edge 67 as most clearly shown in Figure 9. The cutting devices 66 are disposed within slots or apertures 70 formed in the side walls of the housing 31. It will be observed in Figure 9 that a bottom edge portion 71 of the slot 70 in the housing 31 will permit slight engagement therewith of the cutting edge 67.

It will be observed in Figure 10 that the drive means for the shafts 60 and 61 is such that these shafts rotate in opposite directions from each other so that each of the cutting devices 66 has its cutting edge 67 rotating inwardly of the housing 31 successively across the upper edge of the tube 20 and the bottom edge portion 71 of the slot 70 in the manner shown in Figures 8 and 9. The cutting edges 67 during this rotation sever or cut the upper edge portions of the fiber tube 20 by cooperating with the bottom edge portion 71 of the slot 70 which acts as a stationary cutting blade. A more detailed explanation of the operation of the cutting members 66 will be set forth later in the specification.

The pivotally mounted housing or gear box 40 is provided with a suitable cover plate 40a as seen in Figure 6 and the housings 52 and 53 are also provided with substantially C-shaped cover plates 72 and 73. The shaft 36 is provided with a plurality of radially extending projections or spikes 74 which engage the silage S to loosen the same and also to act as a propelling means for rotating the unloaded device 30, as will be hereinafter more clearly set forth.

The shaft 36 is driven by a suitable electric motor 75 (Figures 4, 5, 6 and 7) secured between two spaced motor supporting rod members 76 and 77, each having telescopic portions 76a, 77a which are pivotally secured by pivot means 82, 83 to extending abutment members 80 and 81 on the housing 31.

It will be observed in Figures 4 to 7 that the motor supporting members 76 and 77 are tubular in nature and slidably receive the telescopic portions 76a and 77a therein to freely permit the silage loosening and unloader rotating means 34 to freely move up and down as it travels across the silage having depressions and raised portions therein. The motor 75 is therefore mounted to rise and fall as the unloading device 30 travels across the surface of the silage S having raised and recessed portions therein. The silage loosening and carriage driving unit 34 is pivotally attached to the central housing particularly so this unit 34 may rise and fall in accordance with variations in the diameter of the silo, or in the event of the distance between the central housing and the inner surface of the silo varying in the course of rotation of the unloader or carriage 30.

It will be observed in Figure 7 that the motor 75 is mounted on a plate 84 having one end pivotally secured to end portions of both of the spaced tubular members 76 and 77 and the other end of the mounting plate 84 is secured to the tubular members 76 and 77 by adjustment flanges 85 to permit the motor to be elevated or lowered to maintain the proper tension on a belt 86 which is driven by the same.

A suitable housing 90 (Figures 7 and 11) is secured to the spaced tubular members 76 and 77 which confines a portion of a pulley 91 driven by the belt 86 from the motor 75 and suitable reduction gearing comprising a small pinion gear 92 and a larger gear 93, the latter being secured to a reduced portion on the outer end of shaft 36. It will be observed in Figure 7 that the large pulley 91 is secured on a stub shaft 94 upon which is also secured the small pinion gear 92. The shaft 94 is suitably secured in a heavy thick plate or web 95. Shaft 36 is also journaled in plate 95. The web 95 is suitably positioned to also receive the ends of the tubular members 76 and 77. Rollers 96 are secured to the outer end portion of the housing 90 to engage the inner surface of the silo 10 to facilitate rotation of the unloading device 30.

The silage feeder or conveyor 35 comprises a substantially C-shaped silage scoop 100 having a tapered depending lower end portion 100a (Figures 6, 7, 8 and 12) for readily penetrating into the silage S to scoop the same upon the upper surface of said scoop. The scoop 100 is pivotally secured, by a lug 101 connected thereto, to a pair of projections 102 and 103 formed integral with the housing 31. Suitable pivot means 104 penetrate the lug 101 and the projections 102 and 103 on the housing 31 to pivotally mount the feeder or silage conveyor 35. It will be observed in Figures 8 and 12 that the scoop 100 extends inside the housing 31 through an aperture 105 provided in the side of the housing 31 and the upper edge portion of the aperture 105 has a rounded corner 106 to permit the feeder or silage conveyor 35 to readily pivot into a lower position when there are depressions in the silage S, or to move in either direction in accordance with possible variations in the distance between the central housing 31 and the inner surface of the silo.

A bearing block 110 (Figures 8 and 12) is suitably secured to the inner surface of the top portion of the scoop 100 and carries a suitable bearing 111 (Figure 10) in which one end of a worm screw feeder shaft 112 is rotatably mounted. The outer end of the shaft 112 is rotatably mounted in a bearing plate 113 secured to an outer wall portion 100b of the scoop 100 as shown in Figure 7. The shaft 112 has a spirally arranged blade 112' thereon which engages the silage S scooped up by the scoop 100 to feed the silage into the housing 31 from whence it drops down into the fiber tube or central passageway 20. A pair of rollers 114 are suitably secured to the outer surface of wall portion 100b of the scoop 100, which rollers follow along the inner surface of the silo 10 to facilitate rotation of the tube feeder or conveyor 35.

The rollers 114, as well as the rollers 96 on the silage loosening means 34, are shown in the form of casters and are thus freely pivotal for rolling in a horizontal as well as a vertical direction to substantially follow the contour of the inner surface of the silo 10.

A motor 115 having a small pulley 116 thereon is suitably mounted on the top surface portion of the scoop 100 near its outer end and drives a belt 117 which engages a larger pulley 118 secured on the outer end of the shaft 112 to thus rotate the shaft 112 to feed the silage into the housing 31 and the tube 20.

To supply current to the motors 75 and 115 of the silage loosening means 34 and the silage feeding means 35, a pair of contact rings 120, 121 are fixedly secured as by a pressed fit to an insulating member 126 and the outer ends of pins 122, 123 make contact with the inner sides of the rings and the other ends of the pins 122 and 123 are connected to wires or conductors 124 and 125 which lead to a suitable source of current, not shown, above the lifting hoist 24. The wires 124, 125 are preferably encased in a flexible cable 124a which extends upwardly and is wound about a reel 24a which may be driven by and is mounted on the hoist 24. The hoist 24 and its reel 24a may be of well known conventional construction and, therefore, a detailed description thereof is deemed unnecessary. It is apparent that suitable means, similar to that shown in the upper central portion of Figure 8, would be required for establishing contact between the ends of the wires remote from the carriage 30 and a source of current.

Of course, if desired, the cable 124a may be of a coiled type, such as is sometimes used for connecting telephone receivers, in lieu of using the reel 24a. The pins 122 and 123, as will be observed in Figure 8, are secured in a substantially circular insulating member 126, which is mounted on a bearing member 130, preferably of the anti-friction type. As will be observed in Figure 6, the wires 132, 133 and 134, 135 for motors 75 and 115, respectively, are connected by brushes 132', 133', 134', 135' to the upper and lower rings 120 and 121. Accordingly, it will be observed that the motors 75 and 115 receive electrical energy through their wires which are electrically connected to the upper and lower rings 120 and 121 in the insulating block or member 126 mounted on the bearing 130 having portions secured to the housing and around which bearing the housing 31 rotates to thus present an electrical connection wherein wires 124 and 125, connected to an outside source of current, not shown, can remain stationary and not be twisted apart.

As will be observed in Figure 8, the housing 31 is provided with an annular shoulder portion 140 which rests upon the edge of the uppermost tube section 20a, which shoulder portion 140 is defined by a housing portion 141 having a reduced outside diameter. As will be observed in Figure 8, the reduced portion 141 has an outside diameter slightly less than the inside diameter of the tube sections 20a to be readily received inside the tube 20. It is to be particularly noted in Figures 8 and 9 that the opposed cutting members 66 are so positioned that, during a revolution of the housing 31 they cut away a small portion of the edge of tube 20, say, a quarter of an inch, as shown in dotted lines. The slots or apertures 70 in the housing 31 in which the cutting members 66 are positioned, as will be noted in Figures 8 and 9, extend about a quarter of an inch below the edge of the tube 20 to the lower slot edge 71 which acts as a stationary cutting blade in cooperation with members 66.

Since there are two cutters 66 oppositely positioned, it will be appreciated that, in the course of a hundred eighty degree movement of the housing 31, the upper edge of the tube 20 will be completely cut away one quarter of an inch for example, thus permitting the housing 31 to drop downwardly a corresponding amount on the tube 20 to thus enable the housing 31 and the parts secured thereto to be lowered in the silo 10 to always maintain the rotating and feeding means in contact with the silage S.

*Method of operation*

During the steps of loading the silo 10 with silage S as shown in Figures 1, 2 and 3, the unloading device 30 is retained at the top of the silo 10 by the hoist device 24. Separate switches, not shown, may be conveniently located exteriorly of the silo 10 for manually controlling the flow of electric current to the hoist 24 and to the motors 75, 115 on the unloader or carriage 30. The tube sections 20a are placed upon each other as the silage S increases in height in the silo 10 and a cap 23 is always provided for the tube or passageway 20 during the loading of the silo 10 to prevent the silage S from dropping down inside the same.

After the silo 10 is loaded with the silage S, the cap 23 is removed, and the unloading device or carriage 30 is lowered by the hoist 24 upon the uppermost positioned tube section 20a so the shoulder 140 of the housing 31 rests on the edge of the tube section. In this position, it will be observed in Figure 5 that the weight of the unloading device 30 is substantially supported by the silage S. When the motors 75 and 115 are energized, the rotating means 34 and tube feeder device 35, respectively, are put into operation. The spikes or projections 74 on the shaft 36 of the rotating means 34 will engage the silage S to thus loosen the same and rotate the unloading device 30 around the tube 20. The feeder device 35 will engage the loosened silage S by the scoop or chute 100 which will move the silage into the rotating feeder shaft or screw conveyor 112 to thus feed the silage into the tube 20.

During rotation of the unloading device 30, the pair of cutters 66 will cut away a portion of the edge of the uppermost tube section 20a to permit the housing 31 to drop downwardly as the silage S decreases in the silo 10. It will be observed in Figures 4 to 7 that the rollers 96 and 114 provided on the end of the rotating means 34 and the tube feeding means 35, respectively, permit the same to be more readily rotated by engaging the inner surface of the wall of the silo.

Since the rotating means 34 and the feeding means 35 are pivotally mounted on the housing 31, each of the devices will readily follow the surface of the silage S even though it has raised portions and depressions therein. Also, since the tube sections 20a are made of a readily digestible material, the edge portions cut away by the pair of opposed cutters 66 can readily be mixed with the silage S which is fed into the tube 20 by the feeder device 35.

Accordingly, it will be noted that a novel apparatus and method for unloading a silo has been disclosed. Although the invention is described as particularly applicable for unloading silage from a silo, it is to be understood that it could be readily employed for unloading grain, hay, straw and granular materials such as sand, gravel, etc. from any type of storage bin. The invention is particularly applicable to flow resistant materials.

In the drawings and specification there has been set forth preferred embodiments of the invention and, although specific terms are employed, they are used in a generic and descriptive sense only, and not for purposes of limitation, the scope of the invention being defined in the claims.

I claim:

1. A method of filling and emptying a silo which comprises successively stacking relatively short tubular sections in vertical axial relationship in a central portion of the silo to form a composite discharge tube while feeding silage into the silo and as the height of the silage increases whereby the silage surrounds said sections, then emptying the silo by feeding silage into the open upper end of the composite tube and progressively cutting away the upper end of the tube as the height of the silage decreases and while conveying the silage from the lower end of the tube to a point to one side of the silo.

2. A method of unloading material from a storage bin comprising the steps of vertically positioning a tube substantially at the center of the storage bin and feeding material into said tube while cutting away upper portions thereof.

3. A method of unloading material from a storage bin comprising the steps of vertically positioning a tube through the material in the storage bin, positioning a rotatable unloading device on the top portion of said tube, feeding material into said tube and cutting away portions of the upper edge thereof while rotating said unloading device whereby the unloading device will be lowered as the material is fed into the passageway.

4. Apparatus for unloading silage from a silo comprising a tube forming a vertically arranged passageway through the silage at substantially the mid point of the silo, a housing supported on said tube, means for rotating said housing, means secured to said housing for feeding silage into said tube, and means for automatically cutting away the upper edge of the tube as said housing rotates whereby the housing will automatically be lowered as the silage decreases in the silo.

5. Apparatus for unloading material from a storage bin comprising a vertically positioned tube extending through the material, a housing encircling an upper portion of said tube, means for rotating said housing, means for feeding material through said housing into said tube, and means for automatically cutting away the upper edge of the tube as said housing rotates whereby the housing will automatically be lowered as the material is fed into the tube.

6. An apparatus according to claim 5 wherein said tube is formed of edible fiberboard material and said housing is provided with opposed slots extending below the upper edge of said tube and said cutting means is positioned in said slots.

7. A device for unloading silage from a silo comprising an upright tube extending through the silage at substantially the mid point of the silo, a housing positioned on the upper portion of said tube, means connected to said housing for rotating the same, a pair of opposed cutting devices provided on said housing, said means for rotating the housing being operatively connected to said pair of cutting devices, and feeding means connected to said housing for feeding silage into the tube whereby upon rotation of said housing, said pair of cutting devices will automatically cut away upper portions of said tube to automatically permit said housing to drop downwardly as said silage is fed into the tube by said feeding means.

8. A device according to claim 7 wherein said means for rotating the housing comprises a shaft having a plurality of radially extending projections for engaging the silage.

9. A device according to claim 7 wherein rollers are provided on the remote ends of said means for rotating said housing and said feeding means for engaging the inner surface of the silo to facilitate rotation of the housing.

10. A device according to claim 7 wherein said housing is provided with opposed slots extending below the upper edge of said tube and said pair of opposed cutting devices are operatively mounted in the slots.

11. Apparatus for unloading silage from a silo comprising a tube positioned at substantially the mid point of the silo, a housing resting on the upper portion of said tube, means connected to said housing for rotating the same, feeding means connected to said housing for feeding silage into said tube, and cutting means provided in said housing whereby, upon rotation of said housing to feed the silage into said tube, upper edge portions of the tube will be cut away to lower the housing on said tube.

12. A device for unloading material from a storage bin comprising a tube extending through the material at substantially the mid point of the storage bin, a housing having a portion encircling the upper portion of said tube, means secured to said housing for rotating the same and for loosening the material, feeding means connected to said housing for feeding the loosened material into said tube, and cutting means provided in said housing whereby, upon the rotation of said housing to feed the material into said tube, upper edge portions of the tube will be cut away to lower the housing on said tube.

13. Apparatus for unloading silage from a silo comprising an upright tube penetrating the silage at substantially the mid point of the silo, a silage conveying device positioned at the bottom of said tube, a housing resting on the upper portion of said tube, means secured to said housing for rotating the same and for loosening the silage, feeding means pivotally connected to said housing for feeding the loosened silage into the tube, and cutting means provided in said housing whereby upon rotation of said housing to feed the silage into said tube, upper edge portions of the tube will automatically be cut away to lower the housing on said tube.

14. A device for unloading silage from a silo comprising vertically positioned tube extending through the silage at substantially the mid point of the silo, a housing positioned on the upper edge portion of said tube, means pivotally connected to said housing for rotating the same, cutting means provided on said housing, said rotating means being operatively connected to said cutting means, and feeding means pivotally connected to said housing for feeding silage into the tube whereby upon rotation of said housing by said rotating means, said cutting means will automatically cut away upper portions of said tube to permit said housing to drop downwardly as said silage is fed into the tube by said feeding means.

15. A device for unloading material from a storage bin comprising an upright tube penetrating the material therein, a housing positioned on the upper portion of said tube, means connected to said housing for rotating the same, cutting means provided on said housing, said rotating means being operatively connected to said cutting means and feeding means connected to said housing for feeding material into the tube whereby, upon rotation of said housing by said rotating means, said cutting means will cut away upper portions of said tube to automatically permit said housing to drop downwardly as the material in the storage bin is fed into the tube.

16. A device according to claim 15 wherein said means for rotating said housing comprises an electric motor having conductor lines and means are provided on the housing for maintaining electrical contact and to prevent the twisting of the conductor lines during rotation of said housing.

17. A method of unloading material from a storage bin having an upright tube extending through the material therein comprising the steps of feeding the material into the upper end of the tube and cutting away upper portions of the tube as the material is fed therein to thereby reduce the height of the tube as the height of the material in the bin decreases.

18. In a device for unloading material from a storage bin having an upright tube extending through the material therein; said device comprising means for feeding the material into the upper end of the tube and means for cutting away upper portions of the tube as the material is fed therein whereby the height of the tube is reduced as the height of the material in the bin decreases.

References Cited in the file of this patent

UNITED STATES PATENTS

| | | |
|---|---|---|
| 1,971,716 | Hitchcock | Aug. 26, 1934 |
| 2,500,043 | Radtke | Mar. 7, 1950 |
| 2,505,194 | Loss | Apr. 25, 1950 |
| 2,529,583 | Adams | Nov. 14, 1950 |
| 2,571,277 | Morrow | Oct. 16, 1951 |

FOREIGN PATENTS

| | | |
|---|---|---|
| 118,055 | Great Britain | Aug. 15, 1918 |
| 279,067 | Switzerland | Feb. 16, 1952 |